US008392904B2

(12) United States Patent
Garcia et al.

(10) Patent No.: US 8,392,904 B2
(45) Date of Patent: Mar. 5, 2013

(54) APPARATUS, SYSTEM, AND METHOD FOR EFFICIENT CODE UPDATE

(75) Inventors: Melissa Jorgette Garcia, Tucson, AZ (US); Lourdes Magally Gee, Tucson, AZ (US); Kavitha Gudapati, Austin, TX (US); Andrew Gary Hourselt, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1028 days.

(21) Appl. No.: 12/403,276

(22) Filed: Mar. 12, 2009

(65) Prior Publication Data
US 2010/0235826 A1 Sep. 16, 2010

(51) Int. Cl.
*G06F 9/44* (2006.01)
(52) U.S. Cl. .......................... 717/168; 717/170; 717/172
(58) Field of Classification Search .................. None
See application file for complete search history.

(56) References Cited

U.S. PATENT DOCUMENTS

| | | | |
|---|---|---|---|
| 6,529,723 B1 | 3/2003 | Bentley | |
| 6,591,094 B1 | 7/2003 | Bentley | |
| 6,944,854 B2 | 9/2005 | Kehne et al. | |
| 6,957,256 B1 * | 10/2005 | Bradley et al. | 709/223 |
| 6,971,095 B2 | 11/2005 | Hirai et al. | |
| 6,976,062 B1 | 12/2005 | Denby et al. | |
| 6,980,102 B2 | 12/2005 | Benner et al. | |
| 7,003,767 B2 * | 2/2006 | Larkin | 717/172 |
| 7,055,149 B2 | 5/2006 | Birkholz et al. | |
| 7,103,650 B1 | 9/2006 | Vetrivelkumaran et al. | |
| 7,146,412 B2 | 12/2006 | Turnbull | |
| 7,266,731 B2 | 9/2007 | Ali-Santosa et al. | |
| 7,904,608 B2 * | 3/2011 | Price | 710/11 |
| 2003/0217124 A1 | 11/2003 | Parry | |
| 2003/0217357 A1 * | 11/2003 | Parry | 717/168 |
| 2004/0249934 A1 | 12/2004 | Anderson et al. | |
| 2005/0125489 A1 * | 6/2005 | Hanes | 709/202 |
| 2006/0026304 A1 * | 2/2006 | Price | 710/8 |
| 2006/0184927 A1 * | 8/2006 | Deblaquiere et al. | 717/168 |
| 2006/0206587 A1 | 9/2006 | Fabbrocino | |
| 2007/0036152 A1 | 2/2007 | Giordano, III et al. | |
| 2007/0169106 A1 | 7/2007 | Douglas et al. | |
| 2007/0245335 A1 * | 10/2007 | Minagawa et al. | 717/168 |

(Continued)

OTHER PUBLICATIONS

Joseph Goguen, "Software Component Search", 1996 Journal of Systems Integration, 42 pages, <http://www.springerlink.com/content/p260154527484166/fulltext.pdf>.*

(Continued)

*Primary Examiner* — Thuy Dao
*Assistant Examiner* — Cuong V Luu
(74) *Attorney, Agent, or Firm* — Kunzler Law Group, PC

(57) ABSTRACT

An apparatus, system, and method are disclosed for efficiently collecting code updates. The apparatus includes a generation module that identifies sites that provide code updates based on information about the computing system and its components that is already stored in the system. A supplement module identifies additional sites by monitoring Internet traffic on the computing system and looking for certain keywords, patterns, and regular expressions in visited sites. The user may also manually enter sites to supplement the sites automatically identified by the generation module and the supplement module. A monitor module monitors the identified sites for changes and determines when a new code update is available. A notification module notifies the user of the code updates when the monitor module determines that they have become available. The apparatus may also include a download module that automatically downloads new code updates for the user to install.

20 Claims, 5 Drawing Sheets

U.S. PATENT DOCUMENTS

| | | | |
|---|---|---|---|
| 2008/0005170 A1 | 1/2008 | Costanza et al. | |
| 2008/0104584 A1* | 5/2008 | Murata | 717/168 |
| 2009/0064122 A1* | 3/2009 | Bielski | 717/168 |
| 2009/0172551 A1* | 7/2009 | Kane et al. | 715/733 |
| 2009/0235244 A1* | 9/2009 | Enomori et al. | 717/170 |
| 2010/0293116 A1* | 11/2010 | Feng et al. | 706/12 |
| 2012/0192173 A1* | 7/2012 | Price | 717/172 |

OTHER PUBLICATIONS

Murray Wood et al, "An Information Retrieval System for Software Components", 1998 ACM, pp. 11-28, <http://dl.acm.org/citation.cfm?id=54347.54349>.*

Vinicius Cardoso Garcia et al, "From Specification to Experimentation: A Software Component Search Engine Architecture", 2006 Springer, pp. 82-97, <http://www.springerlink.com/content/u41k63688612vu08/>.*

Robert J. Kauffman et al, "Supporting Search for Reusable Software Objects", Jun. 1996 IEEE, pp. 407-423, <http://ieeexplore.ieee.org/stamp/stamp.jsp?tp=&arnumber=508314>.*

Vinicius C. Garcia et al, "Toward a Code Search Engine Based on the State-of-Art and Practice", 2006 IEEE, 8 pages, <http://ieeexplore.ieee.org/stamp/stamp.jsp?tp=&arnumber=4137403>.*

Rajiv D. Banker et al, "Repository Evaluation of Software Reuse", 1993 IEEE, pp. 379-389, <http://ieeexplore.ieee.org/stamp/stamp.jsp?tp=&arnumber=223805>.*

"Mt Xia: Automatically determine Microcode requirements and upload updates," Copyright 2008 by Mt Xia Inc., http://www.mtxia.com/fancyIndex/Tools/Microcode/, 3 pages.

* cited by examiner

Blade server 312

APPARATUS, SYSTEM, AND METHOD FOR EFFICIENT CODE UPDATE

BACKGROUND

1. Field

This invention relates to providing an aggregation feature for code updates, and more particularly relates to automatically finding and downloading firmware code updates.

2. Description of the Related Art

As the sophistication of computers increases, so do the number of different parts that need to be maintained. For example, a server may be made up of a variety of different physical computers. A blade server includes numerous different components that require maintenance. For example, components such as an advanced management module (AMM), Serial Attached Small Computer System Interface (SCSI) (SAS) Switch Redundant Array of Independent Disks (RAID) controller, Data Storage Server (DSS), Baseboard Management Controller (BMC), server blade Basic Input/Output System (BIOS), and server blade BMC require updates on a regular basis. Where components are not operating with the most recent version of code, problems in the system often result.

However, maintaining all components with the most current version of code can be a difficult task, which is compounded by the number of distinct vendors contributing to a particular system. Since components often come from different vendors, an administrator usually needs to visit numerous sites to get code updates. For example, ten components may need firmware updates. In the worst case scenario, the user needs to manually look at ten different websites (whether they are HTTP, FTP, or some other class) and determine whether the components are already using the most current version of the firmware, or whether she needs to download a code update.

This need to constantly check for code updates, and the need to constantly survey different websites to do so, imposes considerable costs. It increases cost of ownership as the task is time-consuming and requires considerable effort by the administrator. In addition, if the administrator misses a code update, the out of date component can cause trouble in the system as a whole. This requires additional time and effort on the part of the administrator, who has to spend additional time diagnosing the problem before realizing that it is caused by an older version of code.

SUMMARY

The present invention has been developed in response to the present state of the art, and in particular, in response to the problems and needs in the art that have not yet been fully solved by currently available apparatus, systems and methods for efficient code updates. Accordingly, the present invention has been developed to provide an apparatus, system, and method for providing code updates that overcome many or all of the above-discussed shortcomings in the art.

In one embodiment, the apparatus for efficiently collecting code updates includes a generation module that automatically identifies update sites that provide code updates for one or more components in a computing system, and that adds the update websites to an update set. In one embodiment, the generation module uses information about the components of the computing system to identify the update websites.

The apparatus may also include a supplement module that automatically identifies additional update websites not identified by the generation module that provide code updates for components in the computing system. The supplement module does so by monitoring Internet traffic and adding additional update websites to the update if it determines that a particular website visited by the user is an update website. In one embodiment, the supplement module monitors all Internet browsing behavior of the user, and determines that a particular website is an update website by checking websites visited by the user for predefined keywords, patterns, and regular expressions. The supplement module adds websites that contain one or more of the predefined keywords, patterns, and regular expressions to the update set. In certain embodiments, the supplement module receives addresses of update websites directly from the user and adds them to the update set.

The apparatus also includes a monitor module that detects new code updates available on the update websites in the update set by monitoring the plurality of update websites in the update set for changes. In certain embodiments, the monitor module does so by connecting to the update websites in the update set at predefined intervals and determining whether the update websites contain one or more new code updates. The monitor module may make this determination by searching the update websites for changes that have occurred since the last time the monitor module connected to the update website, and determining whether any of the changes involve keywords, patterns, or regular expressions that indicate that new code updates are available. In certain embodiments, the monitor module also receives code update information that is provided by the update websites.

The apparatus also includes a notification module that notifies the user of new code updates that are available in response to the monitor module detecting new code updates on the update websites in the update set. The notification module notifies the user by one or more of an email, a text message, and an on-screen notification. The apparatus, in certain embodiments, also includes a download module that automatically downloads the code updates in response to the monitor module determining that new code updates are available on the update sites.

Also disclosed is a blade server system for efficiently collecting code updates, such as an IBM BladeCenter. The system includes components that require code updates. The code updates may be firmware updates for components in the BladeCenter system. The system includes a generation module, supplement module, monitor module, and notification module as described above. The system may also include a download module. In one embodiment, the modules are implemented in the Advanced Management Module.

Also disclosed is a computer program product, comprising a computer useable medium having a computer readable program code embodied therein. The computer readable program code is adapted to be executed to implement a method for efficiently collecting code updates. The method includes automatically identifying update websites that provide code updates for components in a computing system, and the identification is made using information stored in the computing system. The method includes adding the update websites to an update set.

The method also includes automatically identifying additional update websites that provide code updates for components in the computing system by monitoring Internet browsing of a user, and adding the additional update websites to the update set in response to determining that a particular website visited by the user is an update website.

The method includes detecting new code updates available on the update websites in the update set by monitoring the plurality of update websites in the update set for changes. The method also includes notifying the user of new code updates in response to detecting one or more new code updates on the plurality of update websites in the update set.

The method may include automatically downloading the code updates in response to determining that new code updates are available on the update websites. In certain embodiments, the method includes receiving addresses of update websites directly from the user and adding them to the update set. The method may also include receiving code update information pushed out by one or more of the plurality of update websites.

References throughout this specification to features, advantages, or similar language do not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Many of the functional units described in this specification have been labeled as modules, in order to more particularly emphasize their implementation independence. Modules may include hardware circuits such as one or more processors with memory, Very Large Scale Integration (VLSI) circuits, gate arrays, programmable logic, and/or discrete components. The hardware circuits may perform hardwired logic functions, execute computer readable programs stored on tangible storage devices, and/or execute programmed functions. The computer readable programs may in combination with a computer system perform the functions of the invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

A computer readable medium can be any tangible medium capable of storing machine-readable instructions on a digital processing apparatus. A computer readable medium may be embodied by a transmission line, a compact disk, digital-video disk, a magnetic tape, a Bernoulli drive, a magnetic disk, a punch card, flash memory, integrated circuits, or other digital processing apparatus memory device.

An apparatus can be any piece of machinery, device, or tool that performs the functions described in connection with the apparatus. In certain embodiments, the apparatus includes a processor that reads instructions from a computer readable medium. In certain embodiments, the apparatus includes hardware circuits for performing the specified functions. In certain embodiments, the apparatus includes a combination of hardware and instructions stored on a computer readable medium.

Figure 1:
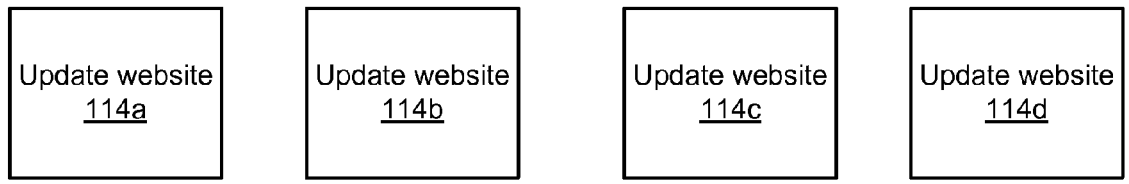
FIG. 1 is a schematic block diagram illustrating one embodiment of a system for retrieving efficient code updates.
Figure 1:
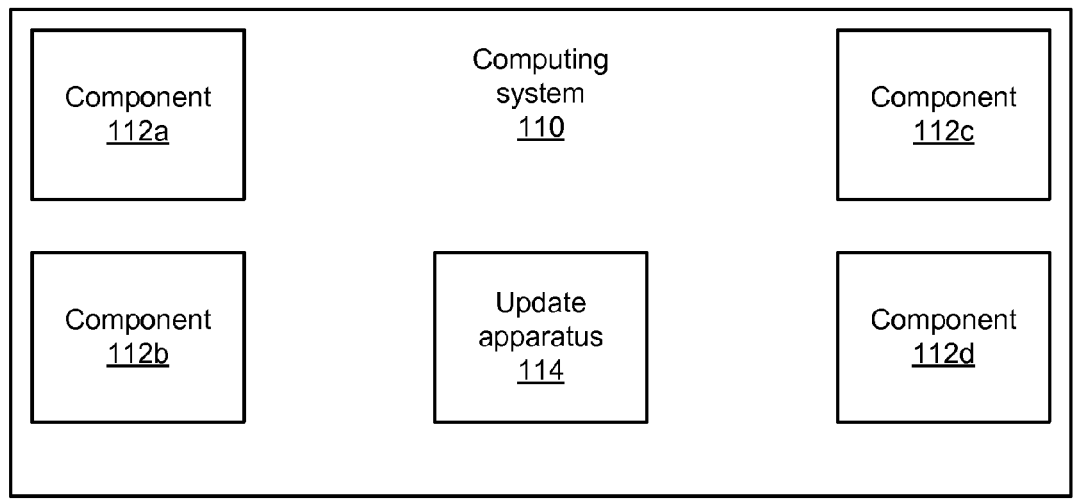

FIG. 1 is a schematic block diagram of a system for efficiently providing code updates. The system includes update websites 114*a-d*, and a computing system 110 that includes an update apparatus 114 and components 112*a-d*. The computing system 110 is a physical system with at least one processor and memory that includes more than one component 112*a-d*. In one embodiment, the computing system 110 is an IBM BladeCenter or other blade server. The blade server is a hardware system that includes a chassis that houses and connects individual blades. The blade server is self-contained, and designed to minimize physical space in comparison with other server systems. In certain embodiments, the chassis of the blade server provides cooling, power, and connectivity for various blades. The blade server also provides a software system that runs on a processor for managing the hardware system. In alternative embodiments, the computing system 110 is a collection of separate computers.

The computing system 110 includes components 112*a-d*. The components 112*a-d* are computing components that require code to operate. In one embodiment, the components 112*a-d* require firmware code to operate. Examples of components 112*a-d* include the AMM, SAS Switch RAID Controller, DSS, BMC, and a Server Blade Bios Server Blade BMC.

The computing system 110 also includes an update apparatus 114. The update apparatus 114 automates the process of detecting code updates and notifying the user of updates. In certain embodiments, the update apparatus 114 also downloads the code updates. In one embodiment, the update apparatus 114 runs on a centralized location, such as the AMM. In other embodiments, the update apparatus 114 runs on a remote location. The depiction in FIG. 1 showing the update apparatus 114 integral to the computing system 110 is simply one possible embodiment. The update apparatus 114 may include modules such as those described in FIG. 2. In certain embodiments, these modules may be implemented as hardware circuits, as software stored on computer readable storage media that executes on a processor and memory, or a combination of the two. Modules may also be implemented as firmware, as a separate application, or may also be implemented as part of an operating system. The modules use a processor and memory to enable their functionality.

FIG. 1 also shows update websites 114*a-d*. The update websites may be http websites, ftp websites, network computer sites, or other sites capable of facilitating a transfer of code for components 112*a-d* known in the art. The update websites contain code updates for one or more of the components 112*a-d* of the computing system 110. The update websites 114*a-d* contain code updates for components 112*a-d* of the computing system 110. In typical embodiments, the necessary code updates for the components 112*a-d* are available on different websites or at different locations within a single website. For example, the vendor of component 112*a* may maintain an update website 114*a*, while a separate vendor of component 112*b* maintains a separate update website 114*b*. In one example, the vendor makes two separate components 112*c* and 112*d*, but maintains code updates for the components 112*c* and 112*d* at different locations (update website 114*c* and 114*d*) within its website. Thus, component 112*c* may have its own page (represented by update website 114*c*), while component 112*d* has a separate page for code updates (represented by update website 114*d*).

Figure 2:
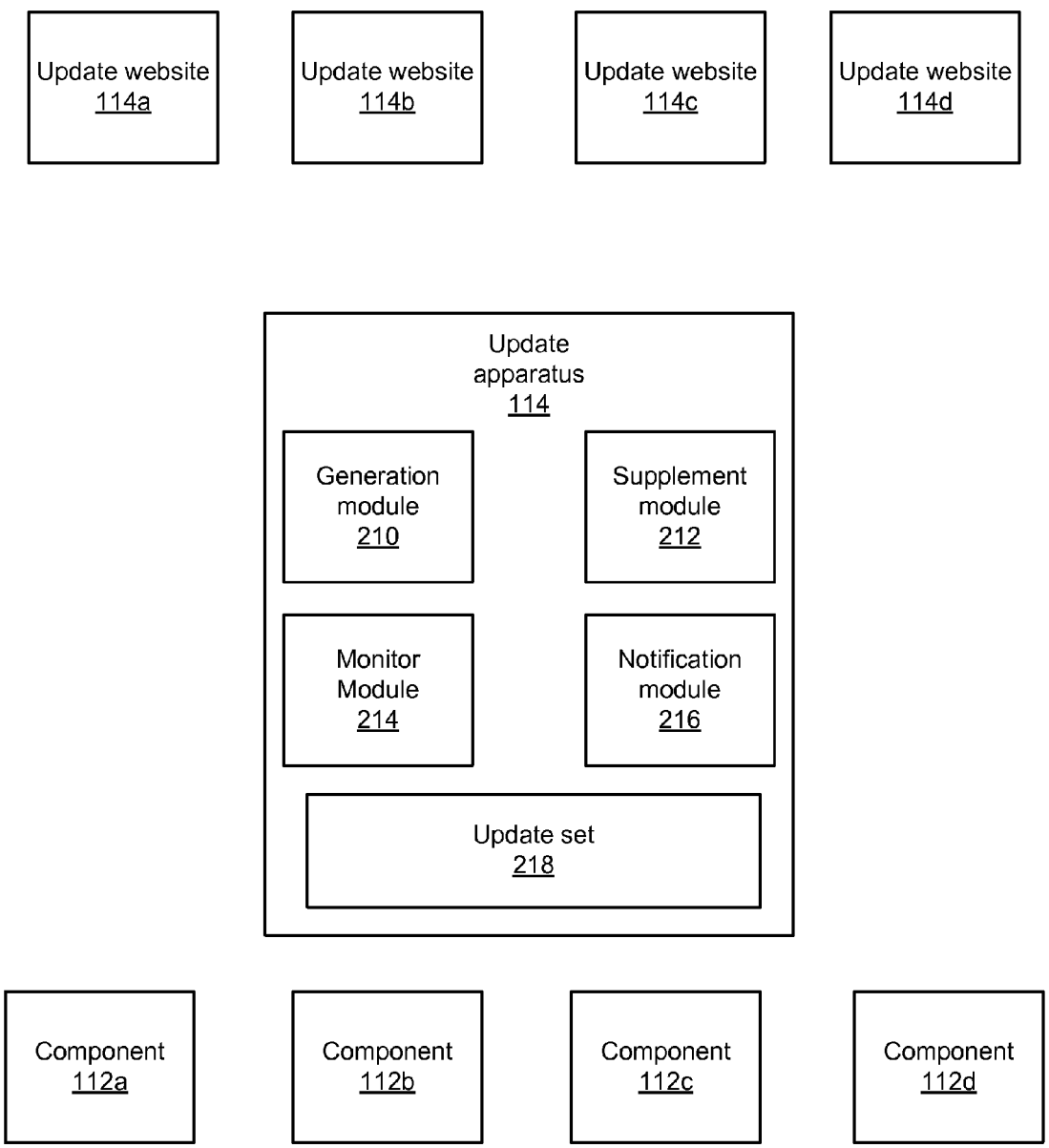
FIG. 2 is a schematic block diagram illustrating one embodiment of an update apparatus.

FIG. 2 shows one embodiment of an update apparatus 114. FIG. 2 also shows update websites 114*a-d* and components 112*a-d* as described in connection with FIG. 1. The update apparatus 114 includes a generation module 210, a supplement module 212, a monitor module 214, a notification module 216, and an update set 218.

The generation module 210 automatically identifies update websites 114*a-d* that provide code updates for one or more of the components 112*a-d*. In one embodiment, the generation module 210 uses predefined data to automatically identify the update websites 114*a-d*. The predefined data may reside on a flat file or in one or more databases.

The predefined data includes identifying information for one or more of the components 112*a-d*. For example, the predefined data may include a list of available BladeCenter product types, a list of the components 112*a-d* (both general identification and model identification), or a list of update website information (such as Uniform Resource Locators (URLs) relevant to one or more of the components 112*a-d*. For example, in IBM BladeCenters, the AMM contains predefined data as described above.

The generation module 210, in one embodiment, collects data, like the list of components, from the firmware and hardware Vital Product Data (VPD) data on the AMM and generates a list of search elements such as keywords, patterns, and regular expressions. For example, the generation module 210 may generate search elements from the component names, product type, code type, and use standard search elements such as "critical update", "firmware update", "blade center", "IBM", "new" or some combination thereof. Patterns may include generic patterns such as "ibm", "fw", "bc", and specific patterns such as "sas" "amm", or patterns specific to URLs. The search elements can be used to identify code updates on the update websites 114*a-d*. The generation module 210 may also utilize user preferences to automatically identify the update websites 114*a-d*. The generation module 210 adds those update websites 114*a-d* that it identifies to the update set 218. The update set 218 may be a list, flat file, database, or other data structure capable of storing update website 114*a-d* information.

The generation module 210, however, may not know of all relevant update websites 114*a-d*. The supplement module 212 automatically identifies additional update websites 114*a-d* by monitoring Internet traffic on the computing system 110. In one embodiment, the supplement module 212 monitors the Internet browsing of the user and adds additional update websites 114*a-d* to the update set 218. The supplement module 212 may monitor all Internet browsing by the user on the computing system 110 and check each website for search elements such as predefined keywords, patterns, and regular expressions as explained above. The supplement module 212 may then designate websites that match specified criteria as update websites 114*a-d* and store information about the update websites 114*a-d* in the update set 218.

For example, the user may visit a website having a URL that includes the model of one of the components 112*a-d*. The website may contain further keywords such as "firmware update," "critical update," or "blade center." The supplement module 212, in certain embodiments, may also monitor the actions of the user on the website to determine whether or not the website is an update website 114*a-d*. For example, if the user then downloads an executable file from the website, the supplement module 212 may determine that the website is an update website 114*a-d* and add it to the update set 218. In one embodiment, the supplement module 212 monitors the URL patterns that the user downloads through the AMM and updates the update set 218 based on the browsing behavior as specified above.

In certain embodiments, the supplement module 212 verifies that the update websites 114*a-d* is not already in the update set 218 before adding it to the update set 218. In addition, if the update website 114*a-d* is already in the update set 218, the supplement module 212 may determine whether the update website 114*a-d* now provides update code for additional components 112*a-d*. For example, the generation module 210 may have determined that the update website 114*a* provides code updates for the component 112*a* and added the update website 114*a* to the update set 218. The supplement module 212 may determine, based on the user's browsing behavior and search elements, that the update website 114*a* also provides code updates for the component 112*b*. The supplement module 212 may then specify that the update website 114*a* be monitored for code updates pertinent to both component 112*a* and component 112*b*.

In one embodiment, the user can directly supply the supplement module 212 with update websites 114*a-d*, which the supplement module 212 then adds to the update set 218. For example, the user may know of one or more update websites 114*a-d* that provide code updates for one or more of the components 112*a-d*. In this embodiment, the user can specify those update websites 114*a-d* directly to the supplement module 212.

In addition, the user may also specify search elements for the update websites 114*a-d*. For example, if the user knows the name of the particular component 112*a-d* associated with the particular update website 114*a-d*, she may specify the name as a keyword. In addition, if the user is familiar with the naming conventions used by the company for code updates on the update website 114a-d, the user may input pattern information for the particular update website 114a-d. In one embodiment, the supplement module 212 automatically generates search elements from the update websites 114a-d.

The monitor module 214 detects code updates that become available on the update websites 114a-d as specified in the update set 218. The monitor module 214 monitors the update websites 114a-d for code updates for the components 112a-d. In one embodiment, the monitor module 214 connects to and polls the update websites 114a-d specified in the update set 218 at regular intervals to check for code updates. The regular intervals may be predefined by the user, thus allowing the user to control the frequency of the checks. The code updates may be either new code, or a new version of existing code.

In one embodiment, the user can specify different frequencies of the polling based on the particular component 112a-d or based on a particular update website 114a-d. For example, certain components 112a-d may need more frequent updating. The user may identify those components 112a-d that need more frequent code updates and specify a shorter interval for those components. In other embodiments, the user may specify that particular update websites 114a-d are important, and set a shorter interval for checking that particular update website 114a-d.

In certain embodiments, an update web site 114a-d may send out a notification when code updates become available. For example, an update website 114a-d may ask for an email address or a phone number and then send an email or text message when code updates are available. In certain embodiments, the user may provide the update website 114a-d with a contact specific to the monitor module 214. In such an embodiment, the monitor module 214 receives the code update information pushed out by the update websites 114a-d. The monitor module 214 may receive pushed information in addition to monitoring the update website 114a-d, or may suspend monitoring for update websites 114a-d that provide notification.

In one embodiment, the monitor module 214 determines a date range in which it should look for code updates. This date range may be based at least in part on the frequency of the polling intervals. For example, if the monitor module 214 polls an update website 114a-d every two weeks, it determines whether or not there have been changes within the last two week period. In one embodiment, the monitor module 214 saves information about the update websites 114a-d each time it polls the update websites 114a-d and uses that information to determine whether or not there have been any changes on the update websites 114a-d.

For example, the monitor module 214 may find and save the names of every executable file available for download on a particular update website 114a. At the next visit, the monitor module 214 determines if either the number of executable files or name of the executable files have changed. If there are either new files or changes in the names of the files, the monitor module 214 uses the search elements to determine whether or not the new or changed files are code updates that the user is interested in.

The monitor module 214 may also search the update websites 114a-d each time to generate new search elements. For example, the monitor module 214 may filter out known search elements such as keywords and patterns and then check the remaining material to determine if there are new keywords or patterns of interest. If so, the monitor module 214 adds the new search elements to the existing search elements. For example, an update website 114b for an IBM BladeCenter may add a new section for a component 112b. The monitor module 214 searches the update website 114b for new search elements and finds keywords relevant to the component 112b. The monitor module 214 adds the search elements to the existing search elements. Thus, on subsequent visits, the monitor module 214 finds code updates relevant to the component 112b.

The notification module 216 notifies the user of one or more code updates if the monitor module 214 detects new code updates on the update websites 114a-d. The new code updates may simply be new versions of code, or may be new code that was not available previously. In one embodiment, the notification module 216 notifies the user by email, text message, or an on-screen notification. For example, the notification module 216 may send an instant message to the user. In other embodiments, the notification module 216 presents a user with a list on the AMM User Interface with new code updates.

In one embodiment, the user sets up preferences that determine how the update apparatus 114 operates. For example, the user may set the frequency with which the update websites 114a-d are checked. The user may also specify the model, type, component names, Uniform Resource Locators (URLs), keywords, or other information for finding code updates. In certain embodiments, the user sets preferences for the notification module 216 functionality. For example, the user may specify the frequency with which notifications should be sent. The user may also have the notification module 216 filter certain types of notifications. For example, the user may choose not be notified of code updates that are changes, such as a new version, but only code updates that are new or a significant revision. Or, the user may specify that only those code updates that the update websites 114a-d designate as "critical" should trigger notification.

Figure 3:
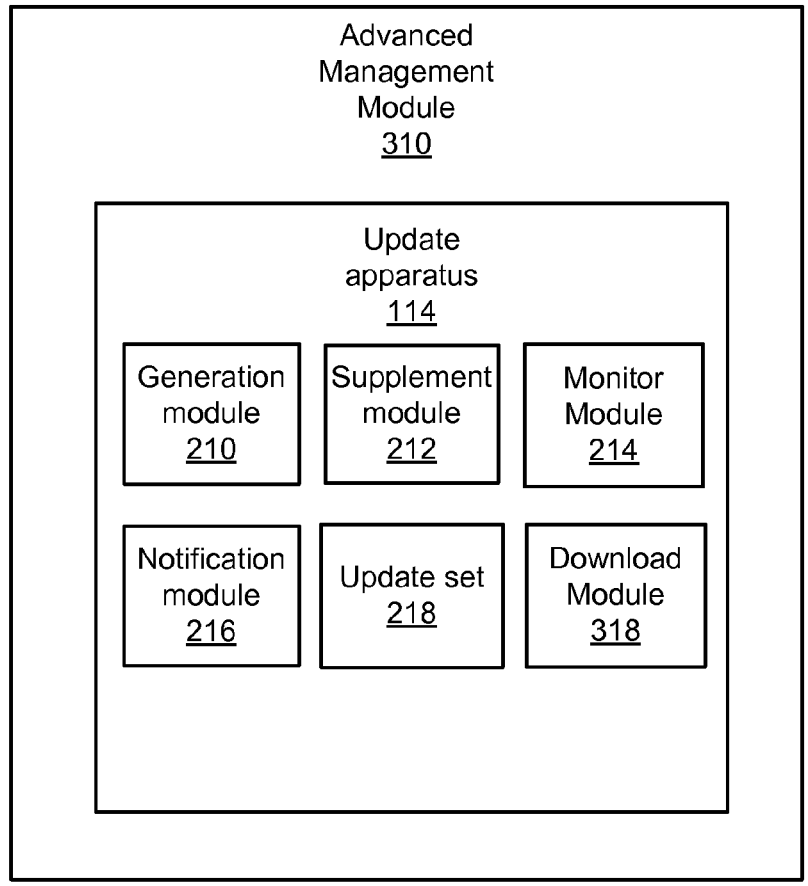
FIG. 3 is a schematic block diagram illustrating one embodiment of an update apparatus in a blade server.
Figure 3:
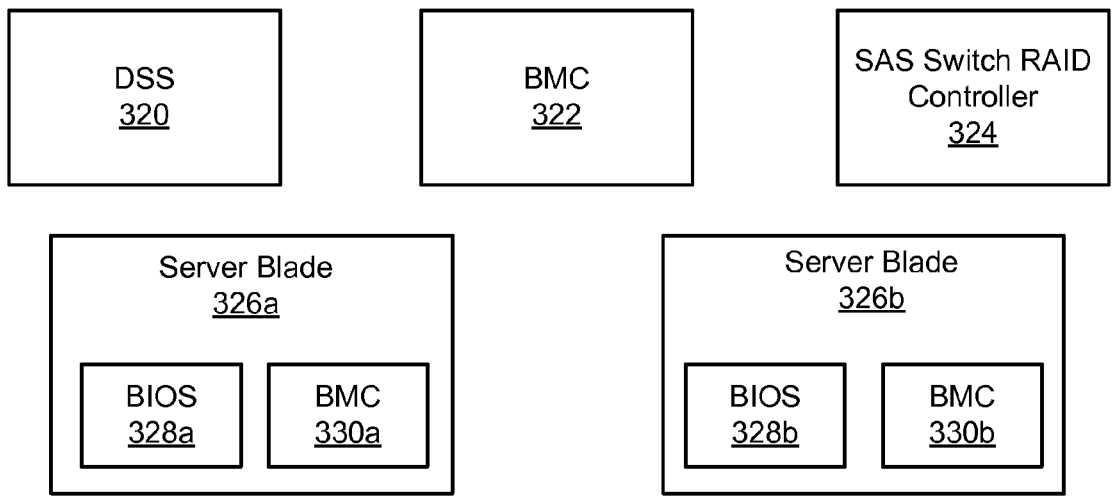

FIG. 3 is a schematic block diagram illustrating one embodiment of a system incorporating an update apparatus 114 in accordance with the present invention. In the depicted embodiment, the computing system is a blade server 312, such as IBM's BladeCenter, with an Advanced Management Module 310 as described above. The blade server 312 includes a variety of components such as the DSS 320, BMC 322, SAS Switch RAID Controller 324, and Server blades 326a-b that require code updates. As illustrated in FIG. 3, certain components may themselves have components that need code updates. For example, the server blades 326a-b include BIOS 328a-b and BMC 330a-b that may require code updates. The update apparatus 114 may be used to gather code update information for all of these components. The blade server 312 may, of course, include additional components or different components than those shown for illustrative purposes in FIG. 3. In the depicted embodiment, the AMM 310 includes the update apparatus 114. As used herein, the AMM 310 also refers to comparable management tools provided in blade server systems of other vendors.

The update apparatus 114 includes a generation module 210, a supplement module 212, a monitor module 214, a notification module 216, and an update set 218, as described above. The update apparatus 114, in the depicted embodiment, also includes a download module 318. The download module 318 downloads the code updates from the update websites 114a-d. In one embodiment, the download module 318 automatically downloads the code updates in response to the monitor module 214 determining that one or more new code updates are available on the update websites.

In certain embodiments, the download module 318 also executes the code updates automatically and installs the code updates on the blade server 312. In other embodiments, the download module 318 simply saves the file and allows the user to manage the execution. The user may also specify one or more locations for the new code updates to be saved to.

In one embodiment, the notification module 216 notifies the user when the new code update has been successfully downloaded. The notification module 216 may also be configured to notify the user of any errors or failures in either downloading or executing the new code updates. As described above, the user may set user preferences to control the amount of information shared by the notification module 216 when the download module 318 downloads or attempts to download code updates.

Figure 4:
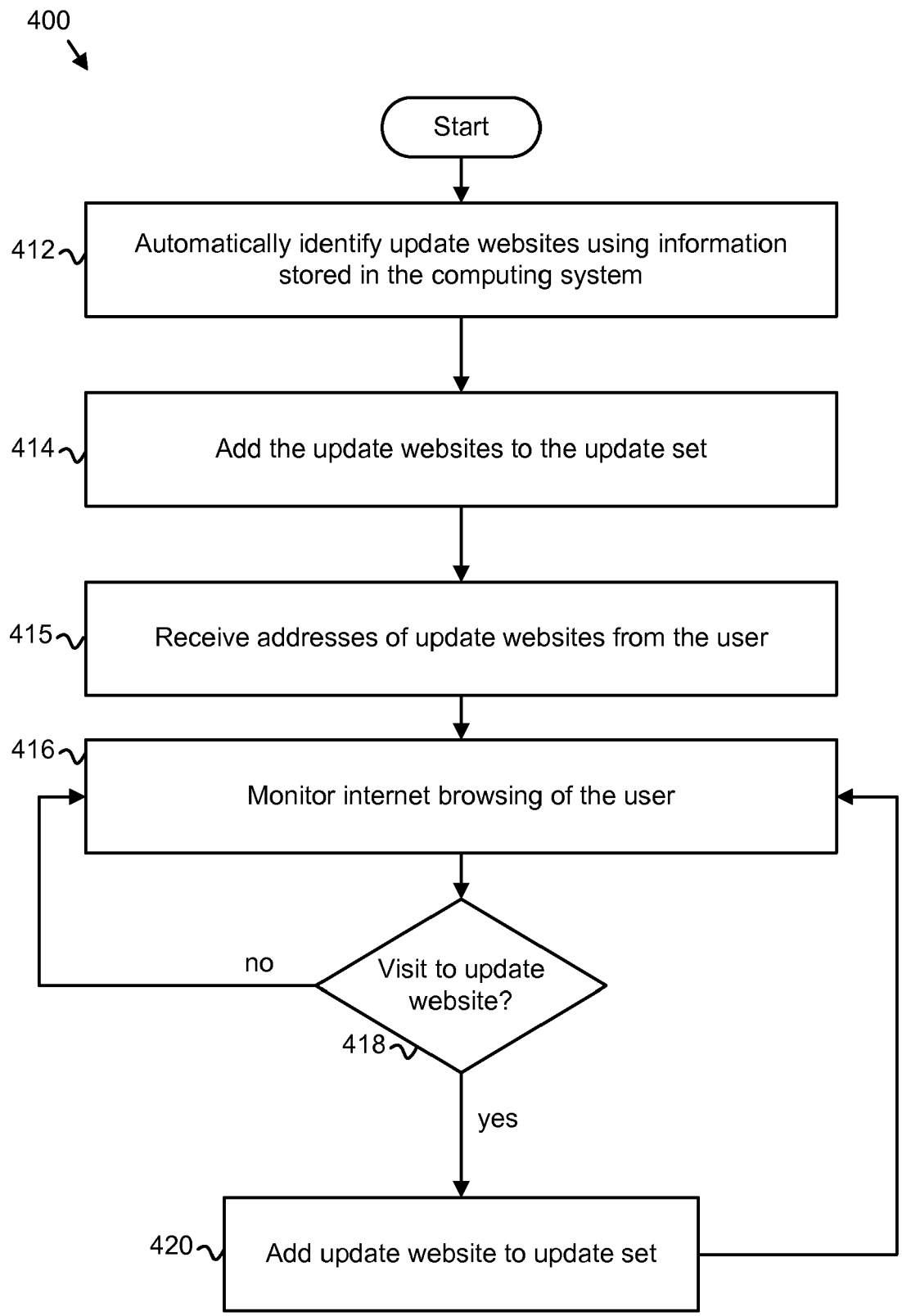
FIG. 4 is a schematic flow chart diagram illustrating one embodiment of a method for identifying update websites.

FIG. 4 shows one embodiment of a method 400 for identifying update websites to be monitored for code updates. The method 400 begins with automatically identifying 412 update websites that provide code updates for components in the computing system using information stored in the computing system. In one embodiment, the generation module 210 performs step 412. The identified update websites 414 are then added to an update set.

In certain embodiments, the method 400 also includes receiving 415 addresses of update websites from the user. In one embodiment, the supplement module 212 receives the update websites directly from the user. The method 400 also includes monitoring 416 Internet traffic by monitoring the browsing of the user and identifying update websites when the user goes to an update website that provides code information for components in the computing system.

In one embodiment, the supplement module 212 determines 418 whether the user is visiting an update website. The supplement module 212 may make this determination by checking websites visited by the user for search elements such as predefined keywords, patterns, and regular expressions. If the particular website is not an update website, then monitoring 416 continues. If the particular website is an update website, the update website is added 420 to the update set, and then monitoring 416 continues.

Figure 5:
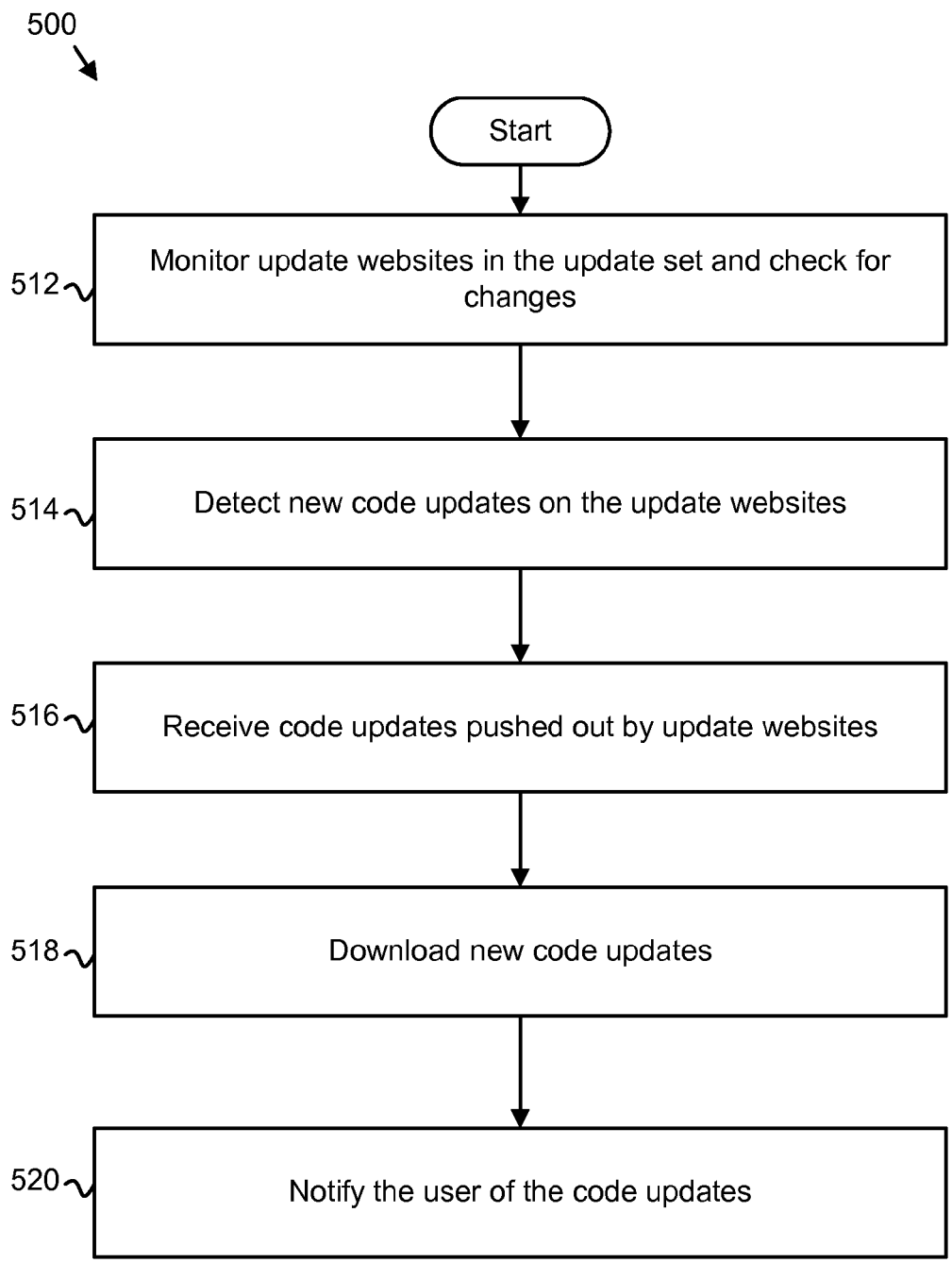
FIG. 5 is a schematic flow chart diagram illustrating one embodiment of a method for detecting code updates.

FIG. 5 shows one embodiment of a method 500 for detecting and providing code updates to the user. The method 500 includes monitoring 512 update websites in the update set and checking the update websites for changes. In one embodiment, the monitor module 214 performs the step 512. The method 500 also includes detecting 514 new code updates on the update websites. In one embodiment, detecting new code updates involves automatically visiting the update websites according to a predefined schedule and automatically checking whether the update websites contain changes. The changes are compared against a set of predefined search criteria to determine whether the changes involve a change to update code available on the website. In certain embodiments, the search criteria used to determine whether there are new code updates is distinct from the search criteria used to determine that a website is an update website. However, the two types of search criteria may be the same, or may have overlapping elements.

In certain embodiments, the method 500 further includes receiving 516 code updates pushed out by update websites. In certain embodiments, the update websites actually push out the code updates themselves; in other embodiments, the update websites push out hyper links to the code updates, while in other embodiments, the update websites simply send notifications indicating that code updates are available. As used in this application, receiving code information pushed out by update websites encompasses each of these variations.

The method 500 may also include downloading 518 new code updates from the update websites. In one embodiment, the code updates are downloaded automatically if it is determined that new code updates are available on the update websites. In addition, the method 500 includes notifying 520 the user of the availability of new code updates if new code updates are detected on the update websites at step 514. In certain embodiments, the notifications are sent as an email, a text message, an on-screen notification, or other method of electronic notification.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for efficiently collecting code updates, the apparatus comprising:
 a generation module that identifies a plurality of known update websites that provide code updates for one or more components in a computing system, and that adds the update websites to an update set;
 a supplement module that automatically identifies one or more additional update websites by monitoring Internet traffic for search elements associated with one or more components of the computing system, the one or more additional update websites providing code updates for one or more components in the computing system, the supplement module adding additional update websites to the update set in response to determining that a particular website contains one or more code updates for one or more components of the computing system;
 a monitor module that detects one or more new code updates available on the plurality of update websites in the update set for one or more components in the computing system by monitoring the plurality of update websites in the update set for changes; and
 a notification module that notifies the user of one or more new code updates in response to the monitor module detecting one or more new code updates on the plurality of update websites in the update set, wherein at least a portion of the generation module, the supplement module, the monitor module, and the notification module comprise one or more of logic hardware and executable code stored on one or more non-transitory computer useable storage media;
 the one or more additional update websites and the plurality of known update websites are distinct.

2. The apparatus of claim 1, further comprising a download module that automatically downloads the code updates in response to the monitor module determining that one or more new code updates are available on one or more of the plurality of update websites.

3. The apparatus of claim 1, wherein the supplement module is further configured to receive addresses of update websites directly from the user and add them to the update set.

4. The apparatus of claim 1, wherein the notification module notifies the user by one or more of an email, a text message, and an on-screen notification.

5. The apparatus of claim 1, wherein the monitor module monitoring the plurality of update websites for changes comprises the monitor module connecting to the plurality of update websites in the update set at predefined intervals and determining whether the update websites contain one or more new code updates.

6. The apparatus of claim 1, wherein the monitor module is further configured to receive code update information provided by one or more of the plurality of update websites.

7. The apparatus of claim 1, wherein the supplement module monitoring Internet traffic comprises the supplement module monitoring all Internet browsing behavior of the user, and wherein determining that a particular website is an update website comprises checking websites visited by the user for predefined keywords, patterns, and regular expressions, and adding websites that contain one or more of the predefined keywords, patterns, and regular expressions to the update set.

8. The apparatus of claim 1, wherein the apparatus is implemented as part of an advanced management module in a blade server system.

9. The apparatus of claim 1, wherein the code updates are firmware updates for one or more components of the computing system, and wherein the computing systems is a blade server system.

10. A blade server system for efficiently collecting code updates, the system comprising:
- a processor;
- one or more components in the blade server that require code updates;
- a generation module that automatically identifies a plurality of known update websites that provide code updates for the one or more components and that adds the update websites to an update set;
- a supplement module that automatically identifies one or more additional update websites by monitoring Internet browsing of a user for search elements associated with one or more components of the computing system, the one or more additional update websites providing code updates for one or more components in the computing system, the supplemental module adding additional update websites to the update set in response to determining that a particular website visited by the user is an update website and determining that the particular website is not in the update set;
- a monitor module that detects one or more new code updates available on the plurality of update websites in the update set for one or more components in the computing system by monitoring the plurality of update websites in the update set for changes; and
- a notification module that notifies the user of one or more new code updates in response to the monitor module detecting one or more code updates on the plurality of update websites in the update set;
- the one or more additional update websites and the plurality of known update websites are distinct.

11. The system of claim 10, further comprising an advanced management module, and wherein the generation module, supplement module, monitor module, and notification module are implemented in the advanced management module.

12. The system of claim 10, further comprising a download module that automatically downloads the code updates to the blade server system in response to the monitor module determining that one or more new code updates are available on one or more of the plurality of update websites.

13. The system of claim 10, wherein the supplement module monitoring Internet browsing further comprises the supplement module monitoring all Internet browsing behavior of the user, and wherein determining that a particular website is an update website comprises checking websites visited by the user for predefined keywords, patterns, and regular expressions.

14. The system of claim 10, wherein the monitor module connects to the plurality of update websites in the update set at predefined intervals and determines whether the update websites contain one or more new code updates.

15. A computer program product, comprising a non-transitory computer useable storage medium having a computer readable program code embodied therein, said computer readable program code adapted to be executed to implement a method for efficiently collecting code updates, said method comprising:
- identifying a plurality of update websites that provide code updates for one or more components in a computing system using information stored in the computing system;
- adding the update websites to an update set;
- identifying one or more additional update websites by monitoring Internet traffic on the computing system for search elements associated with one or more components of the computing system providing code updates for one or more components in the computing system;
- adding the additional update websites to the update set in response to determining that a particular website visited by the user is an update website;
- detecting one or more new code updates available on the plurality of update websites in the update set for one or more components in the computing system by monitoring the plurality of update websites in the update set for changes; and
- notifying the user of one or more new code updates in response to detecting one or more new code updates on the plurality of update websites in the update set;
- the one or more additional update websites and the plurality of known update websites are distinct.

16. The computer program product of claim 15, the method further comprising automatically downloading the code updates in response to determining that one or more new code updates are available on one or more of the plurality of update websites.

17. The computer program product of claim 15, the method further comprising receiving addresses of update websites directly from the user and adding them to the update set.

18. The computer program product of claim 15, the method further comprising receiving code update information provided by one or more of the plurality of update websites.

19. The computer program product of claim 15, wherein monitoring Internet traffic further comprises monitoring all Internet browsing behavior of the user and checking websites visited by the user for predefined keywords, patterns, and regular expressions.

20. The computer program product of claim 19, the method further comprising adding websites that contain one or more of the predefined keywords, patterns, and regular expressions to the update set.

* * * * *